US006385259B1

(12) United States Patent
Sung et al.

(10) Patent No.: US 6,385,259 B1
(45) Date of Patent: May 7, 2002

(54) COMPOSITE CODE MATCH FILTERS

(75) Inventors: Po-An Sung; Jin-Ghee Goh, both of Morris County, NJ (US)

(73) Assignee: Lucent Technologies, Inc., Murray Hill, NJ (US)

(*) Notice: Subject to any disclaimer, the term of this patent is extended or adjusted under 35 U.S.C. 154(b) by 0 days.

(21) Appl. No.: 09/410,294

(22) Filed: Sep. 30, 1999

(51) Int. Cl.[7] ........................... H04L 27/06; H04L 27/30

(52) U.S. Cl. ..................... 375/343; 375/149; 375/367

(58) Field of Search ............................ 375/130, 147, 375/149, 150, 343, 152, 365, 366, 367; 370/503, 509, 514, 515

(56) References Cited

U.S. PATENT DOCUMENTS 5,912,644 A * 12/1999 Wang ........................ 375/130
6,157,619 A * 12/2000 Ozluturk et al. ............ 370/335

OTHER PUBLICATIONS

Byoung–Hoon et al. "Distributed Sample AcquisationBased Fast Cell Search in Inter–Cell Asynchronous DS/CDMA System," IEEE Journal on Selected Area in communication, vol. 18, No. 8, Aug. 2000.*

* cited by examiner

Primary Examiner—Tesfaldet Bocure
(74) Attorney, Agent, or Firm—Howard C. Miskin; Gloria Tsui-Yip

(57) ABSTRACT

A chip synchronization composite code match filter and a frame synchronization composite code match filter are disclosed and respectively serve as the first and second stages of a mobile terminal which also has a third stage for providing a scrambling code identification function. These three stages complete the acquisition function for the mobile terminal. The mobile terminal is particularly suited for operational interaction in the Third Generation Partnership Project (3GPP) Standard. Both the chip synchronization and frame synchronization composite code match filters utilize the hierarchial structure of the Golay code in a manner so as to reduce the components needed to accomplish the chip and frame synchronization functions for the mobile terminal operating within the 3GPP standards.

24 Claims, 13 Drawing Sheets

SPREADING CODE ALLOCATION

| SLOT # | #1 | #2 | #3 | #4 | #5 | #6 | #7 | #8 | #9 | #10 | #11 | #12 | #13 | #14 | #15 | #16 |
|---|---|---|---|---|---|---|---|---|---|---|---|---|---|---|---|---|
| GROUP 1 | 1 | 1 | 2 | 11 | 6 | 3 | 15 | 7 | 8 | 8 | 7 | 15 | 3 | 6 | 11 | 2 |
| GROUP 2 | 1 | 2 | 9 | 3 | 10 | 11 | 13 | 13 | 11 | 10 | 3 | 9 | 2 | 1 | 16 | 16 |
| GROUP 3 | 1 | 3 | 16 | 12 | 14 | 2 | 11 | 2 | 14 | 12 | 16 | 3 | 1 | 13 | 4 | 13 |
| GROUP 4 | 1 | 4 | 6 | 4 | 1 | 10 | 9 | 8 | 17 | 14 | 12 | 14 | 17 | 8 | 9 | 10 |
| GROUP 5 | 1 | 5 | 13 | 13 | 5 | 1 | 7 | 14 | 3 | 16 | 8 | 8 | 16 | 3 | 14 | 7 |
| GROUP 6 | 1 | 6 | 3 | 5 | 9 | 9 | 5 | 3 | 6 | 1 | 4 | 2 | 15 | 15 | 2 | 4 |
| GROUP 7 | 1 | 7 | 10 | 14 | 13 | 17 | 3 | 9 | 9 | 3 | 17 | 13 | 14 | 10 | 7 | 1 |
| GROUP 8 | 1 | 8 | 17 | 6 | 17 | 8 | 1 | 15 | 12 | 5 | 13 | 7 | 13 | 5 | 12 | 15 |
| GROUP 9 | 1 | 9 | 7 | 15 | 4 | 16 | 16 | 4 | 15 | 12 | 9 | 1 | 12 | 17 | 17 | 12 |
| GROUP 10 | 1 | 10 | 14 | 7 | 8 | 7 | 14 | 10 | 1 | 9 | 5 | 12 | 11 | 12 | 5 | 9 |
| GROUP 11 | 1 | 11 | 4 | 16 | 12 | 15 | 12 | 16 | 4 | 11 | 1 | 6 | 10 | 7 | 10 | 6 |
| GROUP 12 | 1 | 12 | 11 | 8 | 16 | 6 | 10 | 5 | 7 | 13 | 14 | 17 | 9 | 2 | 15 | 3 |
| GROUP 13 | 1 | 13 | 1 | 17 | 3 | 14 | 8 | 11 | 10 | 15 | 10 | 11 | 8 | 14 | 3 | 17 |
| GROUP 14 | 1 | 14 | 8 | 9 | 7 | 5 | 6 | 17 | 13 | 17 | 6 | 5 | 7 | 9 | 8 | 14 |
| GROUP 15 | 1 | 15 | 15 | 1 | 11 | 13 | 4 | 6 | 16 | 2 | 2 | 16 | 6 | 4 | 13 | 11 |
| GROUP 16 | 1 | 16 | 5 | 10 | 15 | 4 | 2 | 12 | 2 | 4 | 15 | 10 | 5 | 16 | 1 | 8 |

FIG. 12B

SPREADING CODE ALLOCATION (CONTINUED)

| SLOT # | #1 | #2 | #3 | #4 | #5 | #6 | #7 | #8 | #9 | #10 | #11 | #12 | #13 | #14 | #15 | #16 |
|---|---|---|---|---|---|---|---|---|---|---|---|---|---|---|---|---|
| GROUP 17 | 1 | 17 | 12 | 2 | 2 | 12 | 17 | 1 | 5 | 6 | 11 | 4 | 4 | 11 | 6 | 5 |
| GROUP 18 | 2 | 8 | 11 | 15 | 14 | 1 | 4 | 10 | 10 | 4 | 1 | 14 | 15 | 11 | 8 | 2 |
| GROUP 19 | 2 | 9 | 1 | 7 | 1 | 9 | 2 | 16 | 13 | 6 | 14 | 8 | 14 | 6 | 13 | 16 |
| GROUP 20 | 2 | 10 | 8 | 16 | 5 | 17 | 17 | 5 | 16 | 8 | 10 | 2 | 13 | 1 | 1 | 13 |
| GROUP 21 | 2 | 11 | 15 | 8 | 9 | 8 | 15 | 11 | 2 | 10 | 6 | 13 | 12 | 13 | 6 | 10 |
| GROUP 22 | 2 | 12 | 5 | 17 | 13 | 16 | 13 | 17 | 5 | 12 | 2 | 7 | 11 | N | 11 | 7 |
| GROUP 23 | 2 | 13 | 12 | 9 | 17 | 7 | 11 | 6 | 8 | 14 | 15 | 1 | 10 | 3 | 16 | 4 |
| GROUP 24 | 2 | 14 | 2 | 1 | 4 | 15 | 9 | 12 | 11 | 16 | 11 | 12 | 9 | 15 | 4 | 1 |
| GROUP 25 | 2 | 15 | 9 | 10 | 8 | 6 | 7 | 1 | 14 | 1 | 7 | 6 | 8 | 10 | 9 | 15 |
| GROUP 26 | 2 | 16 | 16 | 2 | 12 | 14 | 5 | 7 | 17 | 3 | 3 | 17 | 7 | 5 | 14 | 12 |
| GROUP 27 | 2 | 17 | 6 | 11 | 16 | 5 | 3 | 13 | 3 | 5 | 16 | 11 | 6 | 17 | 2 | 9 |
| GROUP 28 | 2 | 1 | 13 | 3 | 3 | 13 | 1 | 2 | 6 | 7 | 12 | 5 | 5 | 12 | 7 | 6 |
| GROUP 29 | 2 | 2 | 3 | 12 | 7 | 4 | 16 | 8 | 9 | 9 | 8 | 16 | 4 | 7 | 12 | 3 |
| GROUP 30 | 2 | 3 | 10 | 4 | 11 | 12 | 14 | 14 | 12 | 11 | 4 | 10 | 3 | 2 | 17 | 17 |
| GROUP 31 | 2 | 4 | 17 | 13 | 15 | 3 | 12 | 3 | 15 | 13 | 17 | 4 | 2 | 14 | 5 | 14 |
| GROUP 32 | 2 | 5 | 7 | 5 | 2 | 11 | 10 | 9 | 1 | 15 | 13 | 15 | 1 | 9 | 10 | 11 |

FIG. 13

INITIAL VALUE ASSIGNMENT (X-SEQUENCE)

| CODE GROUP | INITIAL VALUE FOR THE X SEQUENCE $[x^{17}\ x^{16}\ ....\ x^0]$ REPRESENTED IN DECIMAL FORMAT Eg. X=2 IS EQUIVALENT TO THE BINARY FORM X=[0 0 .... 1 0] |
|---|---|
| 1 | X=1,2,...16 |
| 2 | X=17,18,...32 |
| j | X=16*(j-1)+1, 16*(j-1)+2,........, 16*(j-1)+16 |

COMPOSITE CODE MATCH FILTERS

BACKGROUND OF THE INVENTION

The invention relates to a telecommunication apparatus and, more particularly, to chip and frame synchronization stages of a mobile terminal, such as a cellular phone.

Telecommunications establish communications, usually between widely separated points, by electrical or electronic means, with one such electronic means being a mobile terminal, such as a cellular phone. Mobile terminals have an acquisition mode that gathers data by locking into a signal containing data representative carrying a code. Mobile terminals communicate with the home or base station using data formats and protocols based on industry standards, such as the Third Generation Partnership Project (3GPP) known in the art and is described in the Technical Specification V1.0.1 (1999-03).

The acquisition mode of the mobile terminal for the 3GPP standard can be achieved by a three stage electronic device, with the first stage being a receiver stage and performing a chip synchronization function, the second stage performing a frame synchronization function, and the third stage performing a scrambling code identification function. The given description herein refers to various terms associated with the 3GPP standard whose complete definition is more fully described in the 3GPP standard. The 3GPP standard has predetermined data format with a first search code (or primary synchronization code) thereof being herein termed as a Golay code, which can be constructed hierarchically by two codes. To easier describe the formation of Golay code, we define subcode, composite code, which can be described as follows:

Golay code=Z, Z, Z, /Z, /Z, Z, /Z, /Z, Z, Z, Z, /Z, Z, /Z, Z, Z where /Z=complement of Z;

subcode=Z=0 0 0 0 0 0 1 1 0 1 0 1 0 1 1 0;

and composite code=1, 1, 1, −1, −1, 1, −1, −1, 1, 1, 1, −1, 1, which corresponds to the polarity of the subcode in Golay code.

The Golay code that 3GPP is using has 256 coefficient $[C_0 C_1 \ldots C_{255}]$. In the implementation of the present invention, and in a manner known in the art, binary signal "0" is mapped (modulated) to "1" and binary signal "1" is mapped to "−1". Further, the present invention is primarily concerned with the chip and frame synchronization stages of the mobile terminal and the benefits of the present invention may be better understood with reference to a prior art receiver stage which performs chip synchronization and that may be further described with reference to FIG. 1.

FIG. 1 illustrates a code match filter 10 comprised of a shift register 12 having a plurality, n, of delay lines 12A serving as stages thereof and each consisting of a tap-delay, a plurality, n, of multipliers 14 and a plurality, n, of adders 16. The multipliers 14 and adders 16 are arranged as shown so as to sequentially multiply and add together outputs of the stages of the shift register 12 in a cumulative manner. The code match filter 10 receives a signal containing incoming data 18 by way of signal path 18A. As will be further described, the incoming data is actually two separately handled data quantities, that is, I channel data and Q channel data each being separately processed by a code match filter 10. The code match filter 10 operates to places its output on signal path 20. As to be more fully described hereinafter with regard to the present invention, the incoming data 18 is filtered against a first search code (or primary synchronization code) residing in and fetched from a memory block 22A, such as a RAM, to derive slot boundaries in the processor 22.

Although the structure of FIG. 1 has the advantage of fast acquisition, it also has the disadvantage of being of a relatively large chip size. Also, since each delay element is typically a set of D-flip flops (the number of D-flip flops depends on the number of bits the input carries) operating at 7.68 MHz (2 times the chip rate 3.84 MHZ, as defined in 3GPP), the code match filter 10 may require two clock drivers 24 each having an output path 24A to drive the 256 delay elements in serial. It is desired that a chip synchronization composite code match filter be provided that performs the same function as the code match filter 10, but reduces the required number of delay elements and reduces the number of clock drivers. It is further desired to utilize the principles of the chip synchronization composite code match filter of the first stage of the mobile terminal to provide a frame synchronization composite code match filter for the second stage of the mobile terminal.

SUMMARY OF THE INVENTION

The invention in one aspect is a receiver stage of a mobile terminal, such as a cellular phone and in another aspect is a frame synchronization stage of the mobile terminal.

The embodiments of the invention receive data carrying a search code which is hierarchically composed of two codes. The data is filtered against one of the two codes and placed in a temporary buffer. The other code is periodically accessed so as to be multiplied with and then added to the contents of the temporary buffer to determine the correlation between the contents, of the two codes which, in turn, determines and detects the search code being carried by the data.

The receiver stage of the mobile terminal may primarily take the form of a chip synchronization composite code match filter, wherein the term "chip" is known in the art. The chip synchronization composite code match filter despreads the incoming signal with a primary synchronization code. The chip synchronization composite code match filter comprises a demultiplexer, first and second subcode match filters, first and second buffers, a circular buffer, a control unit, a multiply and accumulation unit, and a multiplexer. The demultiplexer receives the signal containing data and split the signal into first and second output signals representative of an on-time and a half-chip delay signal, respectively. The first and second subcode match filters respectively receive the first and second output signals of the demultiplexer with a set of the coefficients. The first and second buffers, respectively, temporarily store the output signals of the first and second subcode match filters. The circular buffer internally circulates a composite code. The control unit accesses and makes available the contents of each of the first and second buffers and that of the circular buffer. The multiply and accumulation unit then multiply the subcode correlation output, which is stored in the first and second buffer with the composite code which stored in the circular buffer and accumulated therein. The multiply and accumulation unit determines the correlation of the input data and Golay code with respect to different chip offsets. The multiplexer multiplexes the two (2) output correlation streams into one output stream.

The frame synchronization composite code match filter incorporates the operating principles of the chip synchronization composite code match filter but needs only comprising one subcode match filter, a shift register, a holding register, a correlator, a lookup table and four buffers.

The invention also provides a method that is applicable to both the chip and frame synchronization operations. The method takes advantage of the hierarchical Golay code being used by the incoming signal. The Golay code as described earlier, can be constructed hierarchically by two codes. More particularly, the present invention defines one of them the subcode and the other the composite code. The subcode is comprised of a predetermined number of coefficients and the composite code is comprised of a predetermined number of coefficients. The method further includes providing at least one shift register having a predetermined number of sequential stages corresponding to the predetermined number of coefficients of the subcode. The shift register has an input stage connected to receive the signal and an output stage.

The method further provides a plurality of multipliers and adders arranged to multiply and then add together the outputs of the sequential stages so as to provide a cumulative output of the shift register. The method provides a first buffer for temporarily holding the output of the shift register and also provides a second buffer for temporarily holding the predetermined number of coefficients of composite code. The method provides access and makes available the contents of the first buffer and the second buffer for temporarily holding the composite code. The method provides a correlator to calculate the correlation of the input data and a second synchronization code by multiplying and accumulating the content of the first buffer, which stores the output of the matched filter, and the composite code stored in the second buffer.

BRIEF DESCRIPTION OF THE DRAWINGS

FIG. 11 illustrates the matrix associated with the coefficients for the Second Hadamard coefficient matrix;

FIG. 12 is composed of FIGS. 12 (A) and 12(B) illustrating the despread code allocation matrix of the present invention; and FIG. 13 illustrates the initial value assignment associated with the X-sequence for the scrambling code identification of the mobile terminal of the present, invention.

DETAILED DESCRIPTION OF THE PREFERRED EMBODIMENTS

In general, the present invention in one aspect comprises a chip synchronization composite code match filter serving as a receiver stage for a mobile terminal, such as a cellular phone. The chip synchronization composite code match filter receives input data carrying a code and directs the data with ½ chip offset difference (known in the art) into two directions with each path having the same structure. Each path also has a RAM serving as a temporary buffer used to hold data while the data is being processed. The chip synchronization composite code match filter further comprises a circular buffer having circulating quantities comprising a composite code. The chip synchronization composite code match filter also has a multiplier and accumulation unit which includes routines that periodically multiply the contents of the stored data with the contents of the circular buffer and add them together to determine correlation between the received input data and a Golay code. The frame synchronization composite code match filter has an operation similar to that of the chip synchronization code match filter. The present invention provides a method having aspects common to both the chip and frame synchronization determinations in which both subcode and composite codes are utilized. The overall operation of the present invention may be further described with reference to FIG. 2 showing an arrangement consisting of the first 26A, second 26B, and third 26C stages of the mobile terminal 26 that includes elements to be further described in detail with reference to FIGS. 3–13.

Figure 2:
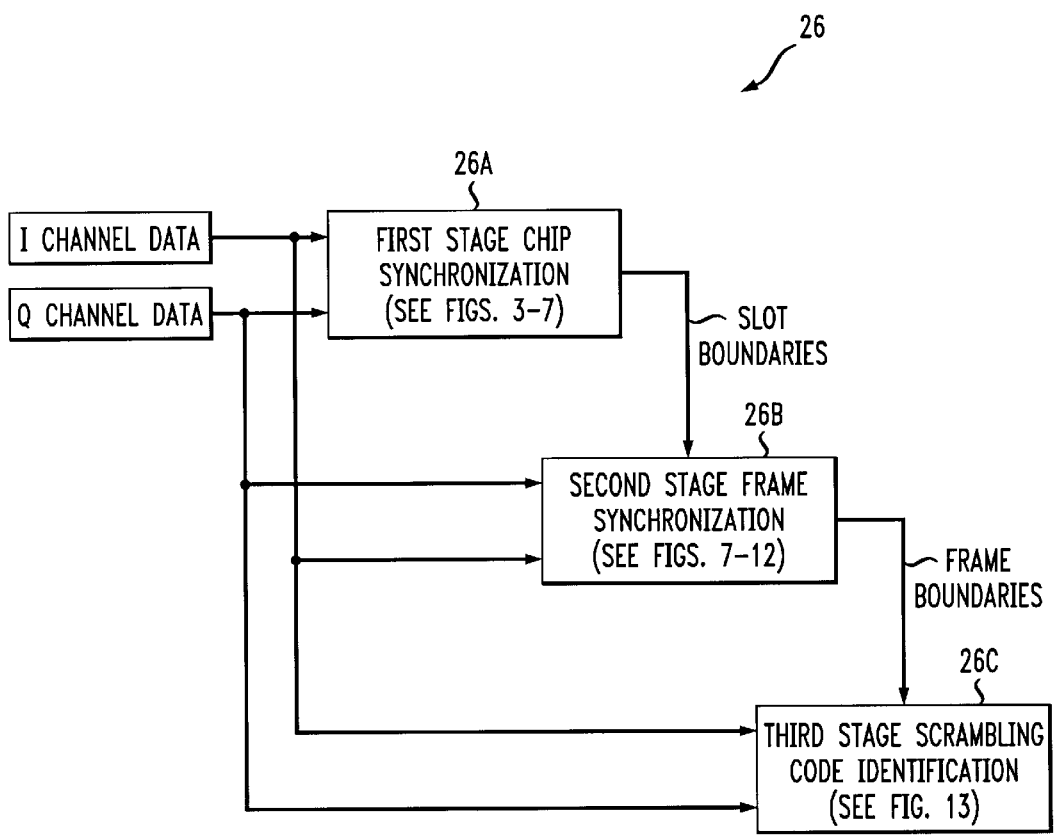
FIG. 2 is a block diagram illustrating the overall operation of the mobile terminal of the present invention which is more fully illustrated in FIGS. 3–13.

FIG. 2 illustrates the mobile terminal 26 as comprised of a first stage chip synchronization 26A, a second stage frame synchronization 26B, and a third stage of scrambling code identification 26C. Each of the first, second and third stages 26A, 26B and 26C, respectively, receives I channel data and Q channel data both known in the telecommunication art. The first stage 26A may be interchangeably referred to as the chip synchronization composite code match filter and similarly the second stage 26B may be interchangeably referred to as the frame synchronization composite code match filter.

The first stage 26A includes two chip synchronization composite filters 28, one for the I channel data and one for the Q channel data and each chip synchronization composite filter has a squarer in its output stage that provides an output to an adder so as to sum the I and Q channel data. The output of the adder is routed to a processor, having routines (to be described) to derive slot boundaries that are inputted into the second stage 26B.

The second stage 26B includes two frame synchronization composite filters, one for the I channel data and one for the Q channel data and each frame synchronization filter operatively cooperates with a squarer, added and processor, in a manner similar to that of the first stage 26A, to now derive frame boundaries that are inputted into the third stage 26C.

The third stage 26C has an arrangement, to be described, to decode the scrambling code carried by the I and Q channel data. The third stage further has a correlator for the I channel data and a correlator for the Q channel data each having a squarer cooperating with an adder in a manner similar to that of the first stage 26A. The details to be given for the correlator of the first stage 26A is applicable to the correlator of the second stage 26B and the third stage 26C. The first stage 26A may be further described with reference to FIG. 3.

Figure 1:
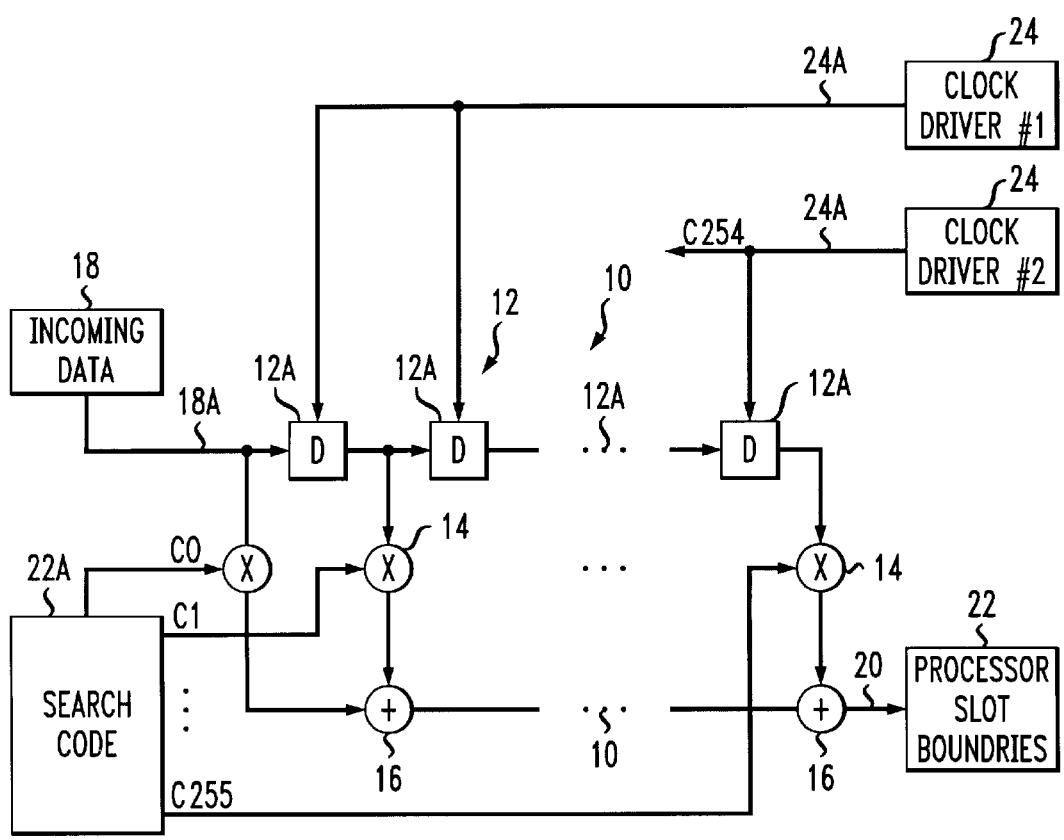
FIG. 1 is a block diagram of a prior art code match filter.
Figure 3:
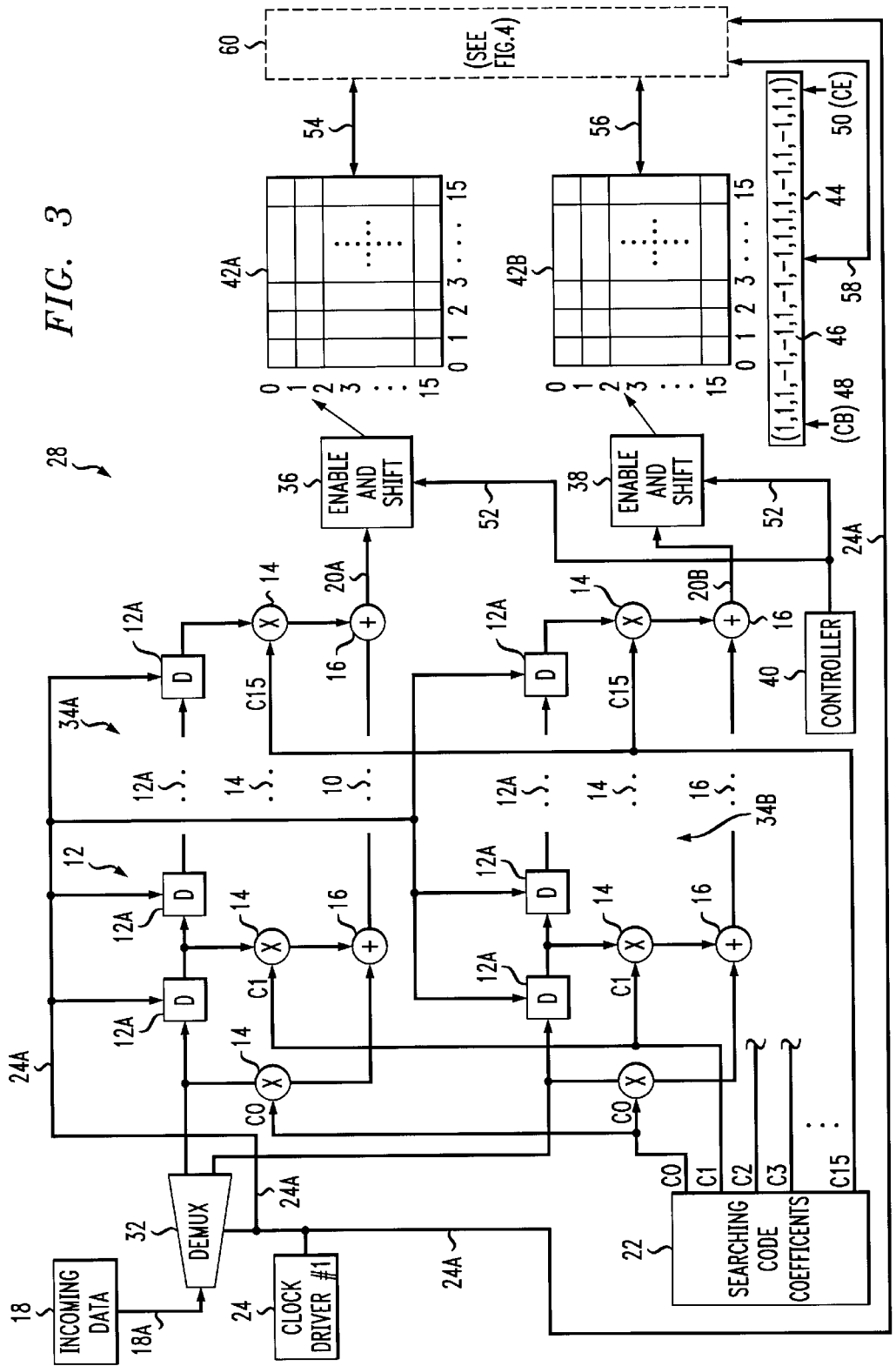
FIG. 3 is a block diagram of one portion of the chip synchronization composite code match filter of the present invention.

FIG. 3 illustrates the chip synchronization composite code match filter 28 as comprised of a plurality of elements, some of which have been described with reference to the code match filter 10 of FIG. 1. A comparison between FIGS. 1 and 3 reveals that the chip synchronization composite code match filter 28 of the present invention has much less delay lines 12A, multipliers 14 and adders 16 as compared to those of the code match filter 10, that is, the chip synchronization composite code match filter 28 has 32 delay lines 12A, 32 multipliers 14, and 32 adders 16, whereas the code match filter 10 of FIG. 1 comprises 256 delay lines 12A, 256 multipliers 14, and 256 adders 16. This reduction beneficially reduces the power consumption and area occupied by the logic chips making up the chip synchronization composite code match filter 28 as compared to the prior art code match filter 10. Further, a comparison between FIGS. 3 and 1 reveals that the composite code match filter 26A only requires one clockdriver 24, whereas the code match filter 10 of FIG. 1 requires two such clock drivers 24. In essence, the benefits of the chip synchronization composite code match filter 26A are achieved by exploiting the hierarchical structural of Golay code, which can be constructed by two codes (subcode and composite code), whereas the prior art code match filter 10 is burden with handling the Golay code directly. Therefore it has a total of two-hundred and fifty-six (256) coefficients. Conversely, in this invention the Golay code is chosen to be 256 in length which is composed of the subcode and composite code, each of which has 16 coefficients.

In general, the chip synchronization composite code match filter 28 receives a signal 18 containing data carrying a code and separates the code from other signal components by the use of a primary synchronization code (as defined in 3GPP), which is chosen to be the hierarchical Golay code. Because of the hierarchical nature, only the subcode and composite codes are needed to be implemented into hardware. Since subcode and composite code only have a length 16, it greatly reduces hardware complexity. The composite code match filter 28 comprises a demultiplexer 32, first and second subcode match filters 34A and 34B, first and second buffers 42A and 42B, a circular buffer 44 and control unit 60 (FIG. 4) performing a correlation function, and a multiplexer 66. The demultiplexer 32 receives the signal 18 carrying the code and providing first and second output signals representative of the received signal. The first and second subcode match filters 34A and 34B, respectively, receive the first and second output signals of the demultiplexer and provide first and second outputs filtered against the subcode. The first and second buffers 42A and 42B receive, respectively, and temporarily store the first and second output signals of the first and second subcode match filters. The circular buffer 44 circulates the composite code. The control unit 60 accesses and makes available the contents of each of the first and second buffers 42A and 42B and the circular buffer 44. The multiply and accumulative unit 60, interchangeably referred to as the control unit 60, multiply the output of each row of the first and second buffers 42A and 42B, respectively, with the composite code stored in the circular buffer 44 and accumulate the result to determine the correlation between the input data and the predetermined Golay code. The multiplexer then multiplexes the correlation value on signal paths 62, 64, each of which corresponds to the correlation value between the predetermined Golay code and the input data with different time offsets, being carried on signal paths 62 and 64, into one output stream.

As previously discussed, the first stage 26A has a separate chip synchronization composite code filter 28 for handling the I channel data and a separate chip synchronization composite code filter 28 for handling the Q channel data. For the sake of brevity, the following discussion describes a general chip synchronization composite code filter 26A that is applicable to both the I and Q channel data. The chip synchronization composite code match filter 28 comprises two subcode match filters 34A and 34B, each of which operate in a manner similar to that as described for the code match filter 10 of FIG. 1 performing delaying, multiplying and adding functions, and each of which provides a decoded output on its respective signal path 20A and 20B, which, in turn, are routed to enable and shift circuits 36 and 38 respectively.

The subcode match filters 34A and 34B utilize sixteen (16) coefficients ($C_0 \ldots C_{15}$), arranged as shown in FIG. 3, and receive the outputs of the demultiplexer 32. The operation of the enable and shift circuits are controlled by a controller 40. The enable and shift circuits 36 and 38 provide outputs that are respectively routed to buffers 42A and 42B.

Each of the buffers 42A and 42B is preferably a RAM having memory locations that are arranged in a matrix such as a rectangular array of m rows and n columns, with the m rows and the n columns each being defined in a range from 0–15. Each of the buffers 42A and 42B consists of contents that are to be multiplied and added with the composite code being circulated within the circular buffer 44 in order to calculate the correlation between the data and the Golay code in a manner as to be more fully described.

The circular buffer 44 constantly circulates a composite code (previously discussed) identified by the reference number 46. The circular buffer 44 has a begin pointer 48 (CB) and circular buffer end pointer 50 (CE) both known in the art.

The enable and shift circuits 36 and 38 are respectively responsive to first and second control signals present on signal path 52. The enable and shift circuits 36 and 38 in response to the first occurrence of their respective control signal generated by controller 40 place the data from the respective subcode match filter 34A or 34B into a first location of its respective buffer 42A or 42B and, in response to the second occurrence thereof, enable and shift circuits 36 and 38 place data from the respective subcode match filter 34A or 34B into a second location of its respective buffer 42A or 42B. The first and second buffer 42A and 42B, along with the circular buffer 44, are accessed by way of circuit paths 54, 56 and 58, respectively, and controlled by a multiply and accumulation unit 60 previously referred to as a control unit 60 and which may be further described with reference to FIG. 4.

Figure 4:
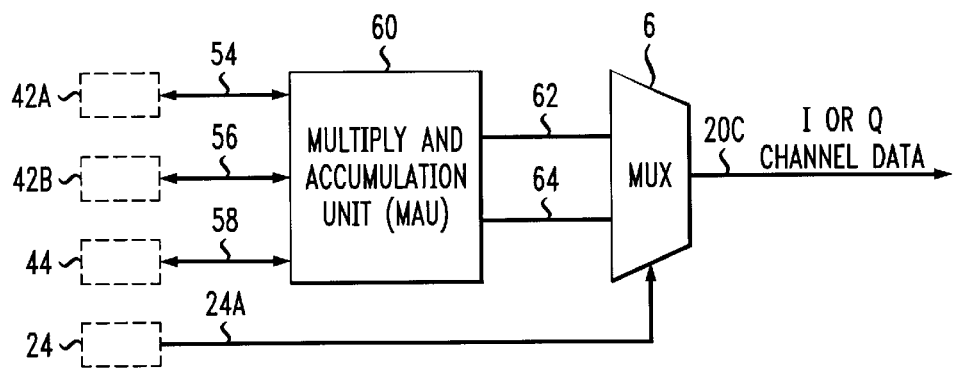
FIG. 4 illustrates the multiply and accumulation unit which operatively cooperates with the circuit arrangement of FIG. 3.

FIG. 4 illustrates the multiply and accumulation unit 60 as having two output paths 62 and 64 which, respectively, route the contents of the first and second buffers 42A and 42B, after performing processing thereon, that is, on these contents in a manner to be described, to a multiplexer 66 receiving the output of clock driver 24 which, in turn, places the multiplexed output on signal path 20C which carries the contents of the I or Q channel data to be further described. In actuality, the multiply and accumulation unit (MAU) 60 comprises first and second multiply and accumulation units (MAU1) and (MAU2) respectively serving buffers 42A and 42B. However, the multiply and accumulation unit (MAU)

60 also includes additional circuiting or programming techniques to service the circular buffer 44. The multiply and accumulation unit 60 also provides a correlation operation which may be further described with reference to FIG. 5.

Figure 5:
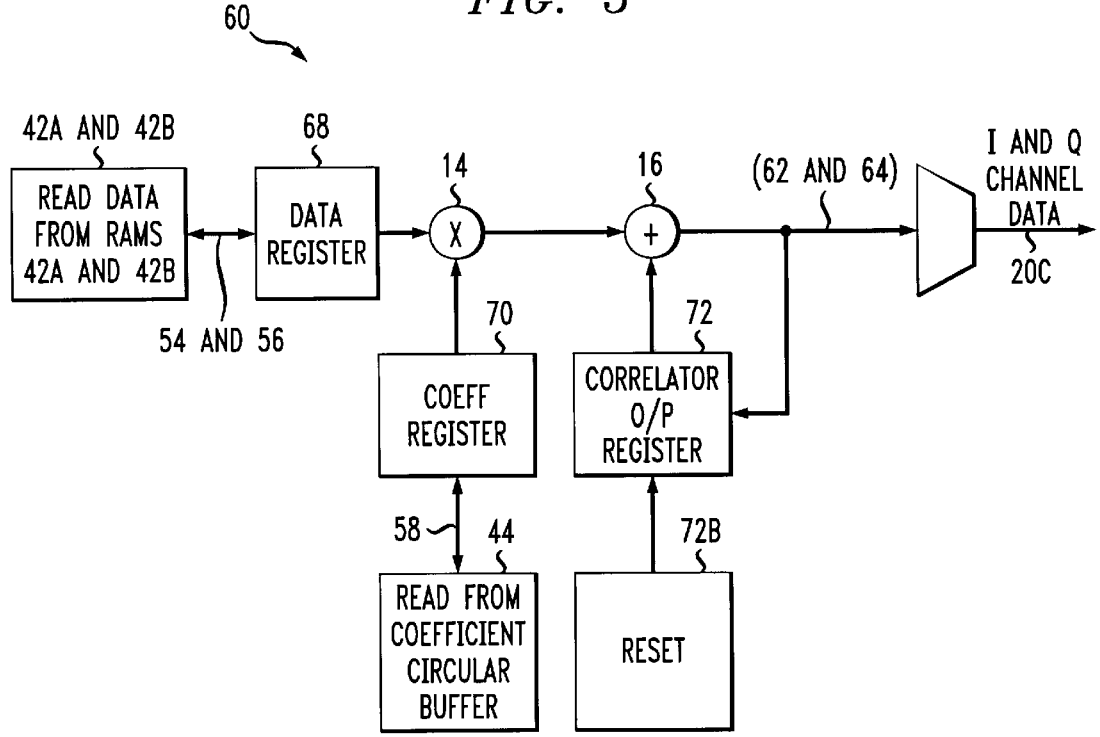
FIG. 5 is a block diagram showing the elements involved with the correlation operation applicable to both the chip synchronization and frame synchronization composite code match filter embodiments of the present invention.

FIG. 5 illustrates the multiply and accumulation unit 60 accessing and reading data from buffers 42A and 42B, via signal paths 54 and 56, and placing such information into a data register 68. The multiply and accumulation unit 60 further reads the coefficients, that is, the composite code from a circular buffer 44, by way of signal path 58, and places such information into a coefficient register 70. The output of the data register 68 and the output of the coefficient register 70 are multiplied together by the operation of multiplier 14 and sent on to the adder 16 where the multiplied contents are added to be previously stored values thereof in the correlator output (o/p) register 72 to accomplish the accumulation. As will also be further described, every sixteen clock occurrences, which correspond to the number of coefficients in the composite code, the contents of the correlator register 72 is routed to a multiplexer 66 by way of adder 16 and reset to zero by reset unit 72B.

Operation of the Composite Code Match Filter

Figure 6:
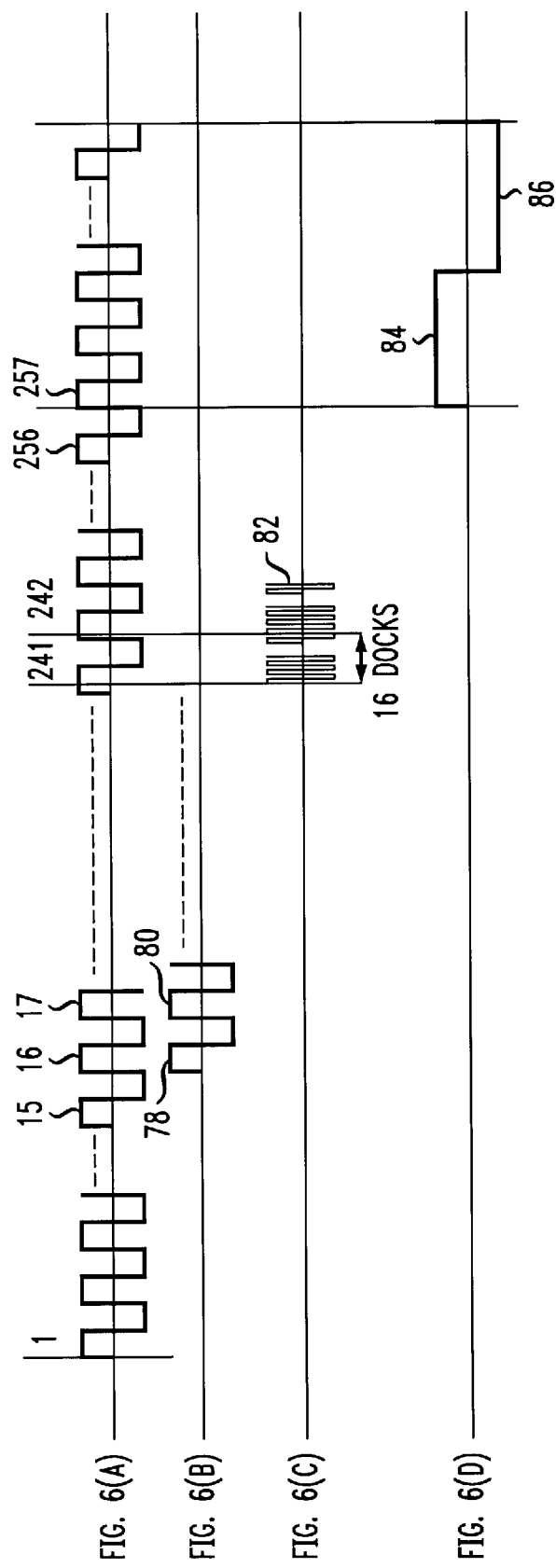
FIG. 6 is composed of FIGS. 6(A), 6(B), 6(C), and 6(D), all of which illustrate the timing involved in the operation of the chip synchronization composite code match filter of the present invention.

In the operation of the present invention, the first step is to initialize the subcode match filters 34A and 34B with the coefficients [$C_{15}$ $C_{14}$ . . . $C_0$] which is the subcode (previously described) of the primary synchronization code and to initiate the circular buffer 44 with the composite code (previously described). The circular buffer 44 has the beginning pointer (CB) 48 that points to the beginning address (shown in FIG. 3 as "1") and an end pointer (CE) that points to the ending address (shown in FIG. 3 as "1"). As previously disclosed, the subcode match filters 34A and 34B handle both I channel data and Q channel data which is referred to as incoming data, such as incoming data 18 of FIG. 3 which comes into the demultiplexer 32 at a clock rate of 7.68 MHz, hereinafter referred to as $f_{clock}$, and the demultiplexer 32 passes it to the subcode match filters 34A and 34B at a clock rate of $½f_{clock}$=3.84 MHz. This dividing by two (2) of the clocking signal is accomplished by the use of demultiplexer 32. The clocking and timing associated with the chip synchronization composite code match filter 26A of the present invention is further shown in FIG. 6 which is composed of FIGS. 6 (A), 6(B), 6(C), and 6(D). FIG. 6(A) shows the clock pulses 1–257 to be described; FIG. 6(B) shows the write to memory pulses such as 78 and 80 which allow information to be placed into buffers 42A and 42B; FIG. 6(C) shows pulses 82 controlling the correlation determination of FIG. 5; and FIG. 6(D) shows the control pulses 84 and 86 controlling the operation of the circular buffer 44 of FIG. 3.

At clock 16, shown in FIG. 6(A), the outputs of the subcode match filters 34A and 34B write to the buffers 42A and 42B both at position (0,0). The writing to buffers 42A and 42B is controlled by enable and shift circuits 36 and 38 which, in turn, is controlled by controller 40. At clock 17, the outputs of the code match filters 34A and 34B write to buffers 42A and 42B, both at position (1,0), and keep writing to fill out the buffers 42A and 42B in a column fashion. More particularly, the outputs of the subcode match filter 34A are written into buffer 42A so as to sequential fill in positions (0,0) (1,0) . . . (15,0) (0,1) (1,1) . . . (15,1) . . . (0,15) (1,15) . . . (15,15), etc., and, similarly the outputs of the subcode match filter 34B are written into buffer 42B so as to sequential fill in positions in the same manner as buffer 42A.

At clock 241, shown in FIG. 6(A), the first row of the RAM block, that is, the first row [positions (0,0) . . . (0,15)] of each of the buffers 42A and 42B, has been filled out, so the MAU (multiply and accumulation unit) 60 fetches the data from the first row of the buffers 42A and 42B and the composite code from coefficient circular buffer and performs the correlation at $½f_{clock}$×16) MHz, in a manner previously described with reference to FIG. 5 correlator. The multiply and accumulation unit 60 places its correlated contents onto signal paths 62 and 64, which are routed to multiplexer 66.

At clock 242, shown in FIG. 6 (A), the second row of the RAM block, that is, the second row [positions (1,0) . . . (1,15)] of each of the buffers 42A and 42B, has been filled out, so the MAU (multiply and accumulation unit) 60 fetches the data from the 2nd row of the buffers 42A and 42B and composite code from circular buffer 44 and performs the correlation at $½f_{clock}$×16 Mhz, in a manner as already described for FIG. 5, and places its correlated contents onto signal paths 62 and 64 which, in turn, are applied to the multiplexer 66.

The above operation described for clocks 241 and 242 continues until the sixteenth (16) row (positions (15,0) . . . (15,15) of the buffers 42A and 42B, that is, the sixteenth row of each of the buffers 42A and 42B, is filled out and this is accomplished by clock 256. At the next clock, that is, clock 257, the circular buffer 44 circulates once, that is, the last address (CE) is moved to be the first address (CB). The circular buffer 44 thus circulates once at $½f_{clock}$/16 Mhz, i.e. CB=CB+1, CE=CE+1 at $½f_{clock}$/16 Mhz. The operation then continues in a manner as previously described.

During each correlation process, that is, at clock 241, 242, . . . 256, the buffers 42A and 42B each contains a correlation between the data and subcode. The contents of each buffer 42A or 42B is multiplied (multiplier 14 of FIG. 5) by the composite code, again comprised of sixteen bits. The results of the multiplication (1 or −1) is then added (adder 16 of FIG. 5) to the contents of the correlation register 72 which is purged and reset every sixteen clocks. Accordingly, the correlator register contains a number that signifies the calculation of the correlation between the incoming data and primary synchronization code (as defined in 3GPP). The remaining operation of the present invention may be further described with reference to FIG. 7.

Figure 7:
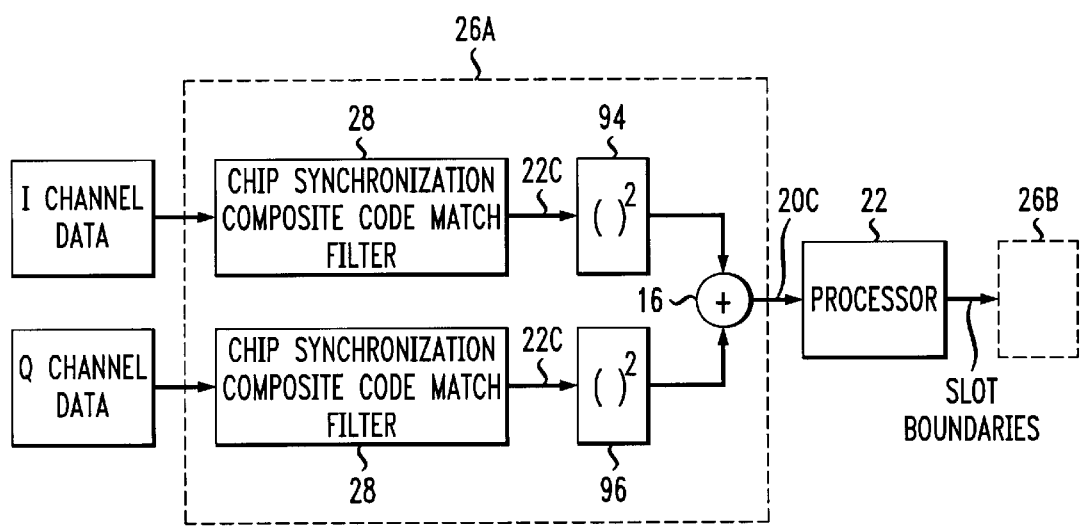
FIG. 7 illustrates one of the operational functions of the present invention.

FIG. 7 illustrates the first stage 26A having a two chip synchronization composite code match filters 28 respectively receiving the I and Q channels data. Each of the chip synchronization composite code match filters 28 has a signal path 22C carrying their respective output signal. The output of the chip synchronization composite code match filter 28 for the I channel is received and squared by squarer 94 and, similarly, the output of the chip synchronization composite code match filter 28 for the Q channel is received and squared by squarer 96, with the outputs of the squarer 94 and 96 being added together by adder 16. The output of the adder 16 is placed onto signal path 20C and routed to processor 22.

The squaring (squarers 94 and 96) and summing (adder 16) is accomplished to derive the correlation for different chip offset, non-coherently, where the term "chip" is a predetermined parameter in the 3GPP data format. The processor 22 has routines (known in the art) that selects the maximum correlation at a particular chip so as to achieve chip synchronization which, in turn, defines the slot boundaries, where the term "slot" is a predetermined parameter in the 3GPP data format.

It should now be appreciated that the practice of the present invention provides for a chip synchronization composite code match filter 28 for each of the I and Q channel data that reduces the number of delay lines, multipliers and adders from the prior art number of 256 to 32 and also reduces the number of clock drivers from at least 2 down to 1. This reduction is primarily achieved by exploiting the hierarchial nature of the Golay codes described previously by providing a subcode match filter comprising sixteen (16) coefficients which is an improvement over the prior art code match filters receiving a Golay code comprising two-hundred and fifty-six (256) coefficients so that the prior art code match filters 10 needs to handle effectively two-hundred and fifty-six (256) items. This reduction is further realized by providing a circular buffer circulating a composite code having sixteen (16) coefficients and a simple multiply and accumulation unit to accomplish the Golay code correlation process in two stages.

Figure 8:
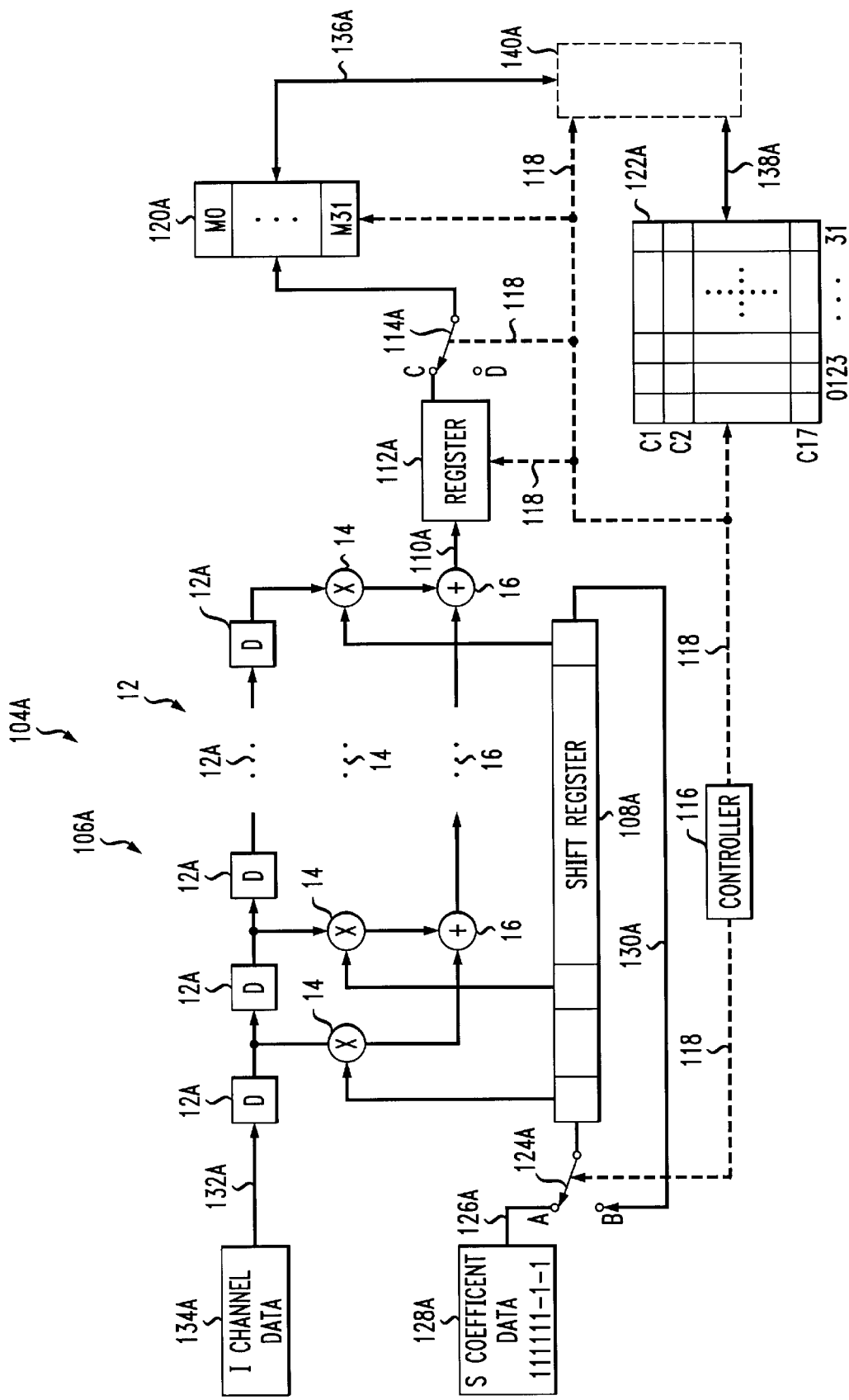
FIG. 8 is a block diagram of the frame synchronization composite code match filter associated with the I channel data.
Figure 9:
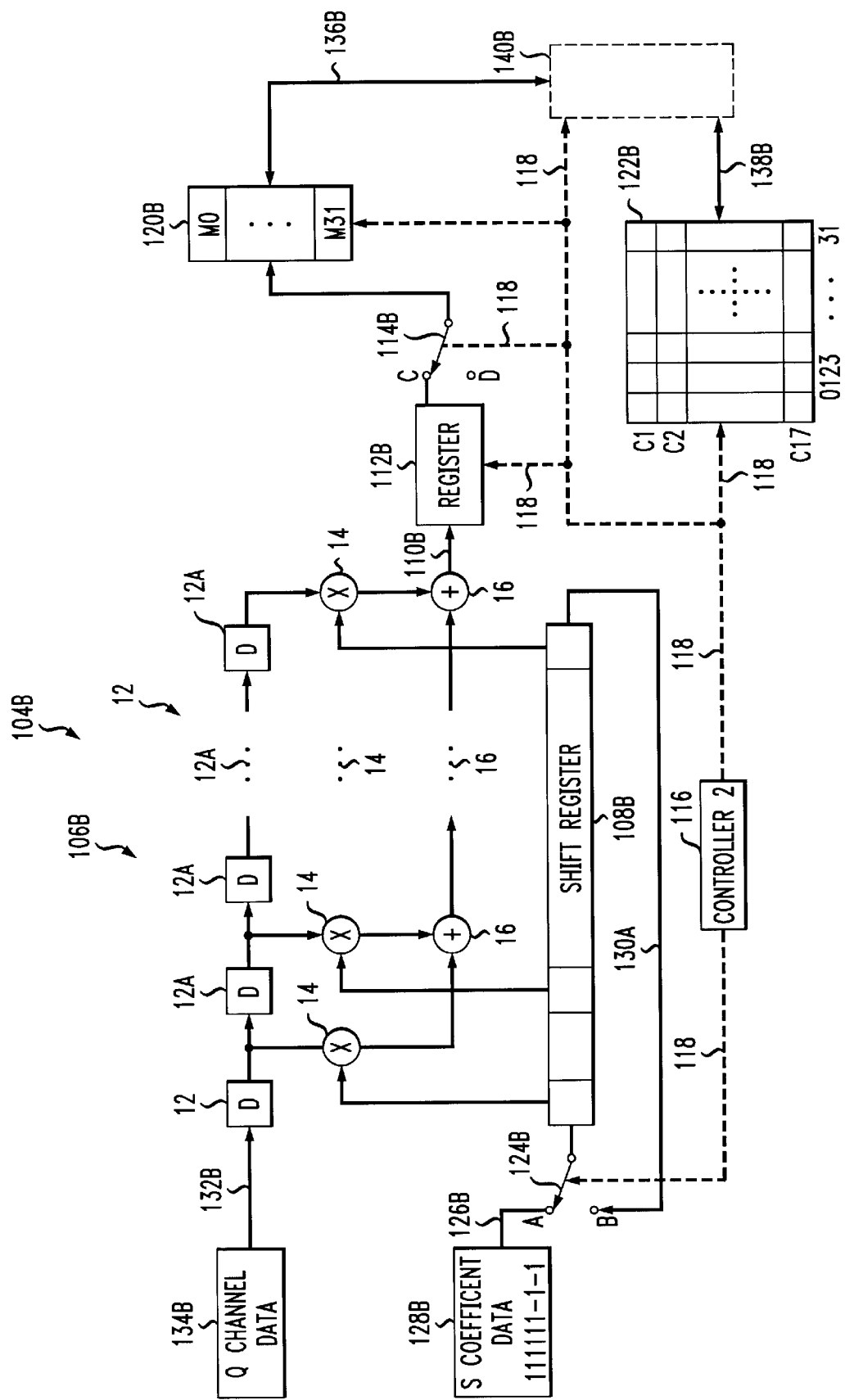
FIG. 9 is a block diagram of the frame synchronization composite code match filter associated with the Q channel data.

The second stage 26B of the acquisition mode for a mobile terminal that receives the slot boundaries information from the first stage 26A is associated with frame synchronization and may be further described with reference to FIGS. 8–13, wherein FIGS. 8 and 9, respectively, illustrate portions of frame synchronization composite code match filters 104A and 104B which, in turn, are respectively associated with the I channel data and the Q channel data. FIGS. 8 and 9 utilize elements which are essentially the same and, wherein FIG. 8 utilizes the letter A to identify its elements, and FIG. 9 utilizes the letter B to identify its elements. The description of the frame synchronization composite code match filter 104A for the I channel data, is essentially the same as that for the frame synchronization composite code match filter 104B for the Q channel data.

In general, the frame synchronization composite code match filter 104A receives a signal carrying a code and separate the code from other signal components by the use of a secondary synchronization code (as defined in 3GPP), which are chosen to be hierarchical Golay codes which is constructed by having S coefficients as the subcode, as well as a composite code in the form of second Hadamard coefficients. The frame synchronization composite code match filter comprises a code match filter 106A and a shift register 108A, an arrangement of multipliers 14 and adders 18, a register 112A, a controller 116, first and second buffers 120A and 122A, respectively, a correlator 140A (see FIG. 10), an enable and shift circuit 156, a third buffer 158, a lookup table 162 and a fourth buffer 164.

The code match filter 106A has a predetermined number of stages and an additional delay element 12A on its front end which receives the signal comprising I channel data 134A and passes the data 134A to the code match filter 106A. The shift register 108A has a first controllable switch 124A on its front end responsive to a first control signal and having an on-off state and which receives S coefficients and passes the S coefficients to the shift register 108A when in the on state. The shift register 108A has a number of stages corresponding to the number of coefficients making up the S coefficients. The arrangement has a plurality of multipliers 14 and adders 16, with the plurality of multipliers interposed between and interconnecting the stages of the shift register 108A to the stages of the code match filter 106A. Each of the multipliers 14 provides a multiplied output routed to a respective one of the adders 16 with the last adder providing an output representative of the summed output of the code match filter 106A. The register 112A receives the summed output of said code match filter 106A and has a second controllable switch 114A responsive to a second control signal and has an on-off state. The register 112A provides an output when the second controllable switch 114A is in its on state in response to a second control signal. The first buffer 120A is connected to receive the output of the register 112A. The second buffer 122A has predetermined coefficients stored therein. The enable and shift circuit 156 provides an output responsive to a third control signal. The correlator 140A examines the contents in buffers 120A and 122A to calculate the correlation between the input data and secondary synchronization code and provides an output thereof that is routed to the enable and shift circuit 156. The third buffer 158 is connected to receive the output of the enable and shift circuit 156 and makes its contents available. The fourth buffer 164 has predetermined locations. The lookup table 162 is responsive to a fourth control signal and directs and made available contents of the third buffer 158 into the predetermined locations of the fourth buffer 164. The controller 116 generates the first, second, third and fourth control signals.

FIG. 8 illustrates the frame synchronization composite code match filter 104A as comprising a code match filter 106A comprising a plurality, eight (8), of delay elements 12A, which is typically a D-flip-flop in hardware, a plurality, eight (8), of multipliers 14, and a plurality, eight (8), of adders 16. The timing interconnected to the delay elements 12A of FIG. 8 is not shown for the sake of brevity, but such interconnections are the same as those of FIG. 3. The multipliers 14 and adders 16 of FIGS. 8 and 9 are arranged in a manner as already described in FIG. 3. Unlike FIG. 3, the code match filters 106A and 106B of FIGS. 8 and 9, respectively, have a delay element 12A in the front end of the code match filters 106A and 106B.

The frame synchronization composite code match filter 104A further comprises a shift register 108A for storing the subcode coefficient of the secondary synchronization code and is connected to the multipliers 14 as shown in FIG. 8. The code match filter 106A performs delaying, multiplying and adding functions, and provides a decoded output on the signal path 110A.

Figure 11:
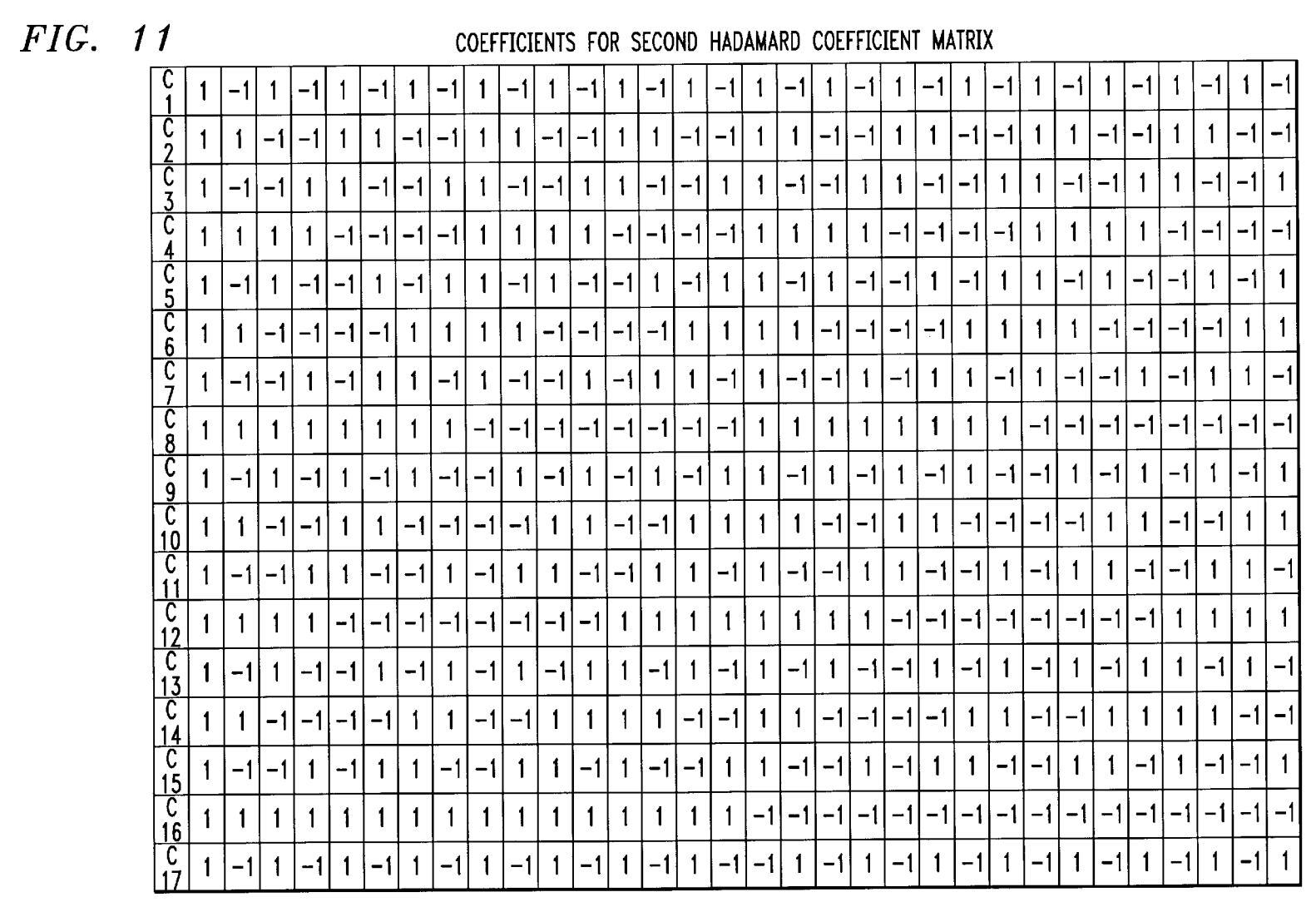

The signal path 110A is routed to a register 112A whose routing of its output quantities is controlled by a switch 114A having positions C and D and which, in turn, is under the control of a controller 116, by way of signal path 118. The contents of register 112A is routed, via switch 114A to a temporary storage location 120A which may have the form of a buffer which, in turn, may be a RAM. As will be described hereinafter, the contents of the buffer 120A is correlated to the contents of a buffer 122A which is also under the control of the controller 116. The information within the buffer 122A is illustrated in FIG. 11 to be further described. The controller 116 also controls a switch 124A.

The switch 124A has two positions A and B, wherein position A accepts the information, via signal path 126A, of the S coefficient data 128A which is a subcode of the secondary synchronization code and wherein position B accepts the output of the shift register 108A, by way of signal path 130A. Similarly, the code match filter 106A, in particular, the delay element 12A at the input stage of the code match filter 106A accepts, by way of signal path 132A, the I channel data 134A. The output of the circuit arrangement of FIG. 8, that is, the contents of buffers 120A and 122A are routed respectively by way of signal paths 136A and 138A to the correlator 140A.

The frame synchronization composite code match filters 104A and 104B has many of the same operating principles as the chip synchronization composite code match filter 28. More particularly, the S coefficients of the secondary synchronization code used for the frame synchronization composite code match filters 104A and 104B serve a similar function as that of the subcode of the Golay code of the primary synchronization code used for the chip synchronization composite code match filters 28 and, similarly, the information, that is, the coefficients for the second Hadamard coefficient matrix of FIG. 11 within buffer 122A serves a similar function as the composite code of the Golay code of the primary synchronization code circulating in the circular buffer 44 of the chip synchronization composite code match filters 28. As will be described, the frame synchronization composite code match filters 104A and 104B derive the quantities $CC_1 \ldots CC_{17}$ which stand for the correlation value between the input data and seventeen (17) secondary synchronization codes as defined in 3GPP. The correlator 140A of the frame synchronization composite code match filters 104A and 104B may be further described with reference to FIG. 10.

Figure 10:
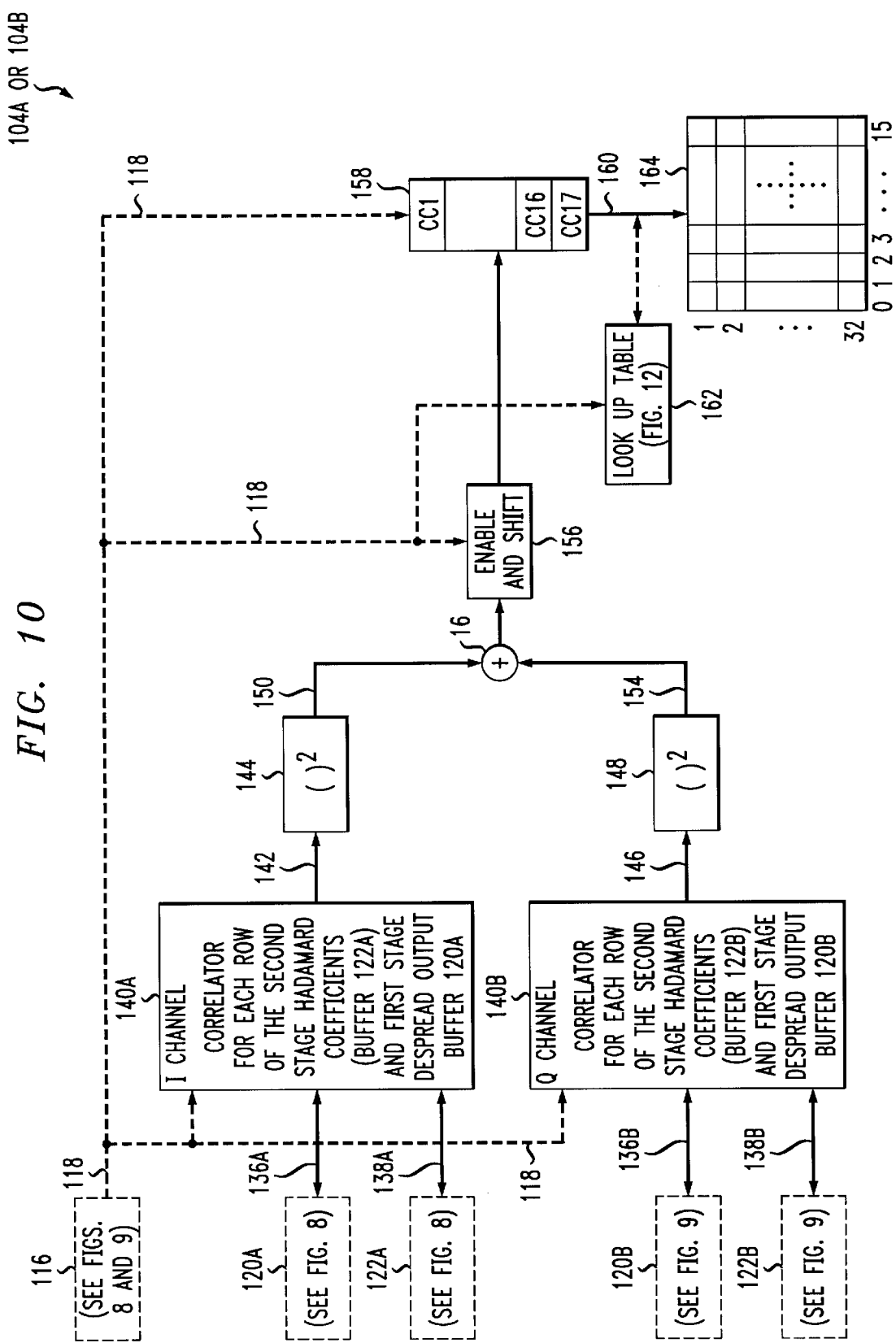
FIG. 10 is a block diagram illustrating the correlation performed on the I and Q channel data.

FIG. 10 illustrates the buffers 120A and 122A as being routed to the I channel correlator 140A. Similarly, the buffers 120B and 122B (both shown in FIG. 9) are routed to the Q channel correlator 140B. FIG. 10 further illustrates the controller 116, shown in both FIGS. 8 and 9, as being routed to the elements of FIG. 10 by way of its control line 118.

The I channel correlator 140A performs a correlation for each of the rows of the second stage Hadamard coefficients (See FIG. 11) against the quantities of the first stage of the despread output (o/p) quantities MO . . . M31 stored in buffer 120A. Similarly, the correlator 140B for the Q channel performs a correlation for each row of the second stage Hadamard coefficients against the first stage of the despread o/p quantities MO . . . M31 stored in buffer 120B. The Hadamard coefficients are known in the art and are especially applicable to the 3GPP standard.

The output of the I channel correlator 140A is routed, via signal path 142, to a squarer 144 and, similarly, the output of the Q channel correlator 140B is routed, via signal path 146, to a squarer 148. The output of the squarer 144 is routed, via signal path 150, to an adder 16, and the output of the squarer 148 is routed, via signal path 154 to the adder 16. The output of the adder 16 is routed to enable and shift circuit 156, controlled by controller 116 via control line 118. The enable and shift circuit 156 directs its received information into buffer 158 and such information is shown as the quantities $CC_1 \ldots CC_{16}$ and $CC_{17}$ which are the values of correlation between the data and the seventeen (17) secondary synchronization codes.

The output contents of the buffer 158 is placed on signal path 160 which, under control of the controller 116, operatively cooperates with a lookup table 162, whose contents are shown in FIG. 12, so that the output contents are stored into predetermined locations in buffer 164 in a manner to be further described.

The contents of matrix shown in FIG. 12 represents a spreading code allocation for the second stage 26B searching code. A review of FIG. 12 reveals that there are thirty-two (32) code groups and each code group consists of sixteen (16) synchronization code sequences, with each code sequence being defined by a slot #1 to #16, where the term "slot" is known in the art especially as being associated with the 3GPP standard. A further review of FIG. 12 reveals that there are seventeen (17) secondary synchronization codes to chose from to form any one code sequence with each numerical number (n=1–17) in FIG. 12 representing a different code sequence. In operation, each cyclic shift of any code sequence is unique. The present invention utilizes this unique feature to form a table of decision variables which is composed of 32 code groups and 16 cyclic shifts. The principles of the frame synchronization stage 26B comprised of frame synchronization composite code match filters 104A and 104B of FIGS. 8–12 may be further described with reference to the overall operation thereof.

Operation of Frame Synchronization Stage

In operation and with reference to FIGS. 8–12, and with the further understanding that the description for the I channel data of FIG. 8 is also applicable to the Q channel data of FIG. 9, during clock 1 to clock 8 associated with the sampler 106A of FIG. 8, the I channel data 134 comes into the delay element 12A at the front end of the code match filter 106A. The clocking is determined by the controller 116. At this time (clock 1–clock 8) switch 124A, under control of controller 116, is in position A so that the S coefficient data 128A (consisting of eight (8) data items) is routed into the front end of shift register 108A.

At the ninth clock, switch 124A is placed in position B by the controller 116 and also switch 144A is placed in position C by the controller 116, so that the contents of the register 112A is routed to the first stage of the buffer 120A, and is shown as M0. The contents of the register 112A is sampled at a rate of $f_{clock2}/8$, where $f_{clock2}=f_{clock}/2$ and $f_{clock}$ has been previously described with reference to FIG. 3 and is also referred to herein as, e.g., clock 1 . . . clock 257. At clock 17, the same operation is performed as that of clock 1–16 and the controller 116 continues placing the then out contents of register 112A into the buffer 120A in a column-like manner until the buffer 120A is filled, which occurs at clock 256. At this time thirty-two (32) blocks (8×32=256) of data have been filtered by the code match filter 106A against the S coefficients comprised of 8 data items.

From clock 257 on, the correlation shown by elements 140A and 140B (multiplier and adder of FIG. 10) gather data from the buffers 120A, 122A, 120B and 122B, and performs the correlation therebetween. The correlation of the contents of buffer 120A against the contents of buffer 122A and the contents of buffer 120B against the contents of buffer 122B is accomplished in a manner similar to that described with reference to FIG. 5 for the chip synchronization composite code match filter 28. A correlation output 142 for the I channel 140A is routed to the squarer 144 and the correlation output 146 from the Q channel 140B is routed to the squarer 148. The contents of the correlated outputs 142 and 146 are squared and then added together by adder 16. The added contents is placed into the buffer 158 by operation of the enable and shift circuit 156. The sequential operation (1–17) of the enable and shift circuit 156 corresponding code correlation ($CC_1$–$CC_{17}$). After calculating the correlation values $CC_1$–$CC_{17}$ and storing them into buffer 158, the contents of buffer 120A is purged and reset and the data of the code match filter 106A is processed. This reset is needed because the data being examined to determine the frame synchronization code for the second stage 26B only has 256 chips, where each chip is a 1 or 0 and where the term "chip" is known in the art, especially as that applicable to the 3GPP standard. The correlation needs to be accomplished before clock 2560, because the next synchronization code starts at clock 2561 in a manner known in the art, especially as being applicable to the 3GPP standard. However, under typical conditions this code correlation is finished after approximately 544 clocks (because the Hadamard coefficient matrix tables 122A and 122B contain 17×32 coefficients, to finish multiplication and addition, approximately 544 clocks are needed). After the code correlation is performed, that is, the contents of buffer 158 is filled, the information is routed via signal path 160 which, under operatively cooperation with the lookup table 162 of FIG. 12 under control of controller 118, is directed into the buffer 164. The buffer 164 is arranged in a matrix (32×16) that corresponds to the matrix (32×16) arrangement of FIG. 12. In essence, the information ($CC_1$–$CC_{17}$) on signal path 160 is placed into the buffer 164 at a location determined by the lookup table 162.

With reference to FIG. 12, in particular FIG. 12(B), group 32 is used as an example for illustrative purposes, and as previously mentioned at clock 257, the correlator output buffer 158 is filled. At this time, controller 116 takes a selected contents of buffer 158, that is, $CC_2$ and puts it into position (32, 0) of buffer 164, sometimes referred to herein as a decision variable matrix. The reason the contents $CC_2$ is placed in position (32,0) is because, as seen in FIG. 12, position (32,0) has a secondary synchronization code of 2 residing therein. This rationale continues for the selected contents of buffer 158. The controller 116 then gets the selected contents $CC_5$ of buffer 158 and puts it into position (32, 1) of buffer 164 and then gathers the selected contents $CC_7$ of buffer 158 and puts it into position (32, 2) of buffer 162. This sequence is continued until all 512 (32×16) values fill the decision variable matrix 164.

At clock 513, the second slot operation is started and the correlation outputs of the buffer 158 is again gathered. At this time, the contents of $CC_5$ of buffer 158 is added to the contents of $CC_2$ which reside in position (32,0) of buffer 164 and such addition is now stored in the same position (32,0) of buffer 164. Now the position (32,0) has the value equal to ($CC_2+CC_5$), both obtained from buffer 158. Next, the quantity $CC_7$ is obtained from buffer 158 and then added to the quantity $CC_5$ which resides in position (32,1) of buffer 164 and then put back into the position (32,1) of buffer 164. Accordingly, at position (32,1) of buffer 164 there is stored the value ($CC_5+CC_7$). This process is continued until all 512 (32×8) values that were in existence in buffer 164 before clock 513 are updated.

After 16 time slots, wherein each time slot is known in the art, especially applicable to the 3GPP standard, the position (32,0) of buffer 162 has stored the value equal to ($CC_2+CC_5+CC_7+CC_5+\ldots+CC_{11}$) which is the correlation output for the code group 32 at time slot left shift 0 time slot. At position (32, 1) the values ($CC_5+CC_7+CC_5+\ldots+CC_2$) are stored which is the correlation of code group 32 at time slot left shift 1 time slot. More particularly, as seen in FIG. 12, the group 32 has its 25 positions occupied by secondary synchronization codes 2, 5, 7, 5, ... 11. The terms "time slot left shift 0 time slot" and "time slot left shift 1 time slot" are known in the art, especially for the 3GPP standard. Using the above manipulations of buffers 158 and 164, and lookup table 160, each position (i, j) is the decision variable for code group i and time slot left shift j.

The above operation described for clocks 257, 513 and the 16 time slots, associated with one radio frame (16 time slots) known in the art, is repeated so that the maximum value of the 512 decision variables, that is, the contents of buffer 164, may be chosen. The maximum value, representative of the maximum correlation between the contents of buffers 120A and 122A and 120B and 122B, identifies code group i and acquires the frame boundaries information so as to achieve the frame synchronization in a manner known in the art and may be performed by the processor 22.

It should now be appreciated that the present invention provides for a frame synchronization composite code filter having many of the operating principles of the chip synchronization composite code filter and that derive the frame boundaries information that is routed to the third stage 26C of acquisition at the mobile terminal. More particularly, the frame synchronization composite code filter uses the S coefficients (8 quantities) similar to the subcode (16 quantities) used by the chip synchronization composite code filter, the coefficients for the second Hardamard coefficient matrix (FIG. 11) similar to the composite code used by the chip synchronization composite code filter, and derives the quantities $CC_1$–$C_{17}$ using correlation processes in a manner used by the chip synchronization composite code filter handling the primary synchronization code, which is a hierarchical Golay code.

The third stage 26C of the acquisition mode of the mobile terminal is concerned with scrambling code identification, that is, to check which scrambling code is used in a cell (known in the art) of the mobile terminal. There are 16 scrambling codes in each code group, such as the code group shown in FIG. 12. The technique for deciding on a scrambling code is done on a symbol by symbol basis, wherein the term "symbol" is known in the art, especially the 3GPP standard that also defines a Primary Common Control Physical Channel (PCCPCH). The Primary CCPCH has nine (9) symbols and each symbol has 256 chips. As known in the art, a complex correlator may be used for each symbol and the output of the complex correlator after processing 256 chips for each symbol is squared.

After squaring, a decision variable $V_1^i$ is derived, where 1 is the first symbol for the Primary CCPCH and $i \in \{1, 2, \ldots 16\}$ (16 scrambling codes). The decision variable $V_1^1$ is then compared with a predetermined threshold $\emptyset_1$. For those values $V_1^1 > \emptyset_1$ the index i is saved in set2=$\{i|V_1^i > \emptyset_1\}$. For the symbol 2, the same procedure is followed for symbol 1, the only difference is that now only the correlation for index i∈set2 is accomplished to form the decision variable $V_2^i$. Then the decision variable $V_2^i$ is compared with predetermined threshold $\emptyset_2$. For those values $V_2^i > \emptyset_2$, the index i for set3 is saved, where set3=$\{i/V_2^i > \emptyset_2\}$.

This procedure is followed for the rest of the remaining nine (9) symbols until only one index is left which is the scrambling code used by the mobile terminal for the present invention.

The scrambling code that may be used by the mobile terminal is a so-called Gold code, known in the art. The Gold code uses X and Y sequences and is generated by a modulo 2 addition of 2 M-sequences. According to the standard applicable to the Gold code, known in the art, the polynomial for generating the X sequence is $1+X^7+X^{18}$ and the polynomial for the Y sequence is $1+X^5+X^7+X^{10}+X^{18}$. The initial value for the Y sequence y(0)=y(1) ... y(17)=1 and the initial value for the X sequence is given in FIG. 13.

Following the above procedure, the scrambling code for the code group can be identified and a counter is loaded so that the initial value for the different Gold code corresponds to different code groups according to the expression given in FIG. 13.

In this manner a simple mechanization is only needed to generate the scrambling code used for different code groups. The scrambling code for the 3GPP standard utilizes a configuration of downlink scrambling code generator.

It should now be appreciated that the practice of the present invention provides for a scrambling code identification method that is used to identify the scrambling code used for the mobile terminal of the present invention.

Various additional modifications will become apparent to those skilled in the art, all such variations which basically rely on the teaching to which this invention has advanced the art are properly considered within the scope of this invention.

What we claim is:

1. A system for receiving a signal containing data carrying a search code hierarchically composed of two codes, a subcode and a composite code, said system comprising:
   (a) a filter receiving the signal and filtering the signal against said subcode and providing an output thereof; and (b) a multiplier and adder for periodically accessing and multiplying said output with said composite code and then adding together the results thereof to determine the correlation between the contents of the two codes which in turn determines and detects the search code being carried by the data.

2. The system according to claim 1, wherein said system comprises two stages with the first stage being a chip synchronization composite code match filter and the second stage being a frame synchronization composite code match filter, said system comprising:

(a) said chip synchronization composite code match filter comprising:
  (i) a demultiplexer receiving the signal carrying the search code and providing first and second output signals representative of said received signal;
  (ii) first and second subcode match filters respectively receiving said first and second output signals of said demultiplexer and providing first and second outputs filtered, respectively, against said subcode;
  (iii) first and second buffers respectively receiving and temporarily storing said first and second output signals of said first and second subcode match filters;
  (iv) a circular buffer for internally circulating said composite code;
  (v) a control unit for accessing and making available the contents of each of said first and second buffers and said circular buffer;
  (vi) a correlator for calculating the correlation between the contents of said first and second buffers and said circular buffer; and
  (vii) a multiplexer for receiving the contents of each of said first and second buffers made available by said control unit; and (b) said frame synchronization composite code match filter comprising:
  (i) a code match filter with a predetermined number of stages and having an additional delay element on its front end which receives said signal and passes said signal to said code match filter;
  (ii) a shift register having a first controllable switch responsive to a first control signal and having an on-off state on its front end and which receives said subcode and passes said subcode to said shift register when in said on state, said shift register having a number of stages corresponding to the number of coefficients making up said subcode;
  (iii) an arrangement of a plurality of multipliers and adders with the plurality of multipliers interposed and interconnecting the stages of the shift register to the stages of the code match filter, each of said multipliers providing a multiplied output to a respective one of said adders with the last adder providing an output representative of the summed output of said first shift register;
  (iv) a register receiving the summed output of said code match filter and having a second controllable switch responsive to a second control signal and having an on-off state, said register providing an output when said second controllable switch is in its on state in response to said second control signal;
  (v) a first buffer connected to receive the output of said register;
  (vi) a second buffer having predetermined coefficients stored therein and serving as said composite code;
  (vii) an enable and shift circuit providing an output responsive to a third control signal;
  (viii) a correlator for determining the correlation between the contents of said first and second buffers and providing an output thereof that is routed to said enable and shift circuit;
  (ix) a third buffer connected to receive the output of said enable and shift circuit and making its contents available;
  (x) a fourth buffer having predetermined locations;
  (xi) a lookup table responsive to a fourth control signal for directing and making available contents of said third buffer into said predetermined locations of said fourth buffer; and
  (xii) a controller for generating said first, second, third and fourth control signals.

3. The system according to claim 2, wherein said system further comprises a third stage which is a scrambling code identification stage that uses a Gold code.

4. A chip synchronization composite code match filter for receiving a signal containing data carrying a code and separating the code from other signal components by the use of a search code having a Golay code comprised of a subcode and a composite code, said chip synchronization composite code match filter comprising;

(a) a demultiplexer receiving the signal carrying the code and providing first and second output signals representative of said received signal;

(b) first and second subcode match filters respectively receiving said first and second output signals of said demultiplexer and providing first and second outputs filtered, respectively, against said subcode;

(c) first and second buffers respectively receiving and temporarily storing said first and second output signals of said first and second subcode match filters;

(d) a circular buffer for internally circulating said composite code;

(e) a control unit for accessing and making available the contents of each of said first and second buffers and said circular buffer;

(f) a correlator for calculating the correlation between the contents of said first and second buffers and said circular buffer; and (g) a multiplexer for receiving the contents of each of said first and second buffers made available by said control unit.

5. The chip synchronization composite code match filter according to claim 4, wherein said search code is defined as follows:

Golay Code=$Z, Z, Z, /Z, /Z, Z, /Z, /Z, Z, Z, Z, /Z, Z, /Z, Z, Z,$ where $/Z$=complement of $Z$;

Subcode of said Golay code=$Z$=0000001101010110;

Composite code of said Golay code=1, 1, 1, −1, −1, 1, −1, −1, 1, 1, 1, −1, 1, −1, 1, 1;

and where binary signal 0 is mapped to 1 and binary signal 1 is mapped to −1 in physical implementation; and wherein said quantities being circulated in said circular buffer are defined as follows:

1, 1, 1, −1, −1, 1, −1, −1, 1, 1, 1, −1, 1, −1, 1, 1 where 1=$Z$ and −1=$/Z_i$.

6. The chip synchronization composite code match filter according to claim 4, wherein said subcode of said Golay code having a plurality of coefficients, wherein each of said subcode match filters comprises:

a plurality of tap delay lines corresponding to the number of coefficients of said subcode, arranged into a shift register having an input and an output;

a plurality of multipliers corresponding to the number of coefficients of said subcode, arranged in correspondence with said delay lines and with the first multiplier thereof arranged with the input of said shift register and with the last multiplier thereof arranged with the output of said shift register; and a plurality of adders corresponding to the number of coefficients of said subcode, arranged in correspondence with the said multipliers and with the first adder thereof arranged to receive the output of said first multiplier and with the last adder thereof arranged to receive the output of said last multiplier.

7. The chip synchronization composite code match filter according to claim 6, wherein said subcode of said Golay code having sixteen coefficients, wherein each of said subcode match filters having sixteen delays lines, sixteen multipliers and sixteen adders.

8. The chip synchronization composite code match filter according to claim 4, wherein said correlator comprises:

a multiplier for multiplying the contents of said first buffer with the content of said circular buffer and the content of said second buffer with the content of said circular buffer and providing an output for each said multiplication; and an accumulator for accumulating the output of each of said multiplication.

9. The chip synchronization composite code match filter according to claim 6 further comprising a clock driver providing an output to each of said tap delay lines, to said multiplexer and to said demultiplexer.

10. The composite code match filter according to claim 4, wherein each of said first and second buffers is arranged in a matrix of a rectangular array of m×n quantities arranged in m rows and n columns.

11. The composite code match filter according to claim 10, wherein said m rows and n columns are each defined in a range of 0 to 15.

12. The composite code match filter according to claim 4 further comprising:

(a) first and second enable and shift circuits respectively interposed between said first and second subcode match filters and said first and second buffers, said first and second enable and shift circuits being respectively responsive to first and second control signals and in response to the first occurrence thereof place the data from the respective subcode matched filter into a first location of the respective buffer and in response to the second occurrence thereof place the data from the respective subcode match filter into a second location of the respective buffer; and (b) a controller interconnected to said first and second enable and shift circuits and generating said first and second control signals.

13. A frame synchronization composite code match filter for receiving a signal carrying a code and separating the code from other signal components by the use of a search code having S coefficients as well as having a composite code, said frame synchronization composite code match filter comprising:

a) a code match filter with a predetermined number of stages and having an additional delay element on its front end which receives said signal and passes said signal to said code match filter;

b) a shift register having a first controllable switch responsive to a first control signal and having an on-off state on its front end and which receives said S coefficients and passes said S coefficients to said shift register when in said on state, said shift register having a number of stages corresponding to the number of coefficients making up the S coefficients;

c) an arrangement of a plurality of multipliers and adders with the plurality of multipliers interposed and interconnecting the stages of the shift register to the stages of the code match filter, each of said multipliers providing a multiplied output to a respective one of said adders with the last adder providing an output representative of the summed output of said first shift register;

d) a register receiving the summed output of said code match filter and having a second controllable switch responsive to a second control signal and having an on-off state, said register providing an output when said second controllable switch is in its on state in response to said second control signal;

e) a first buffer connected to receive the output of said register;

f) a second buffer having predetermined coefficients stored therein and serving as said composite code;

g) an enable and shift circuit providing an output responsive to a third control signal;

h) a correlator for determining the correlation between the contents of said first and second buffers and providing an output thereof that is routed to said enable and shift circuit;

i) a third buffer connected to receive the output of said enable and shift circuit and making its contents available;

j) a fourth buffer having predetermined locations;

k) a lookup table responsive to a fourth control signal for directing the made available contents of said third buffer into said predetermined locations of said fourth buffer; and l) a controller for generating said first, second, third and fourth control signals.

14. The frame synchronization composite code match filter according to claim 13, wherein said S coefficients has eight (8) coefficients, said first and second shift registers have eight (8) stages, said first buffer being arranged in a matrix having one column and thirty-two (32) rows, said second buffer being arranged in a matrix having seventeen (17) rows and thirty-two (32) columns, said third buffer being arranged in a matrix having one column and seventeen (17) rows, said lookup table being arranged in a matrix having thirty-two (32) rows and sixteen (16) columns, and said fourth buffer being arranged in a matrix having thirty-two (32) rows and sixteen (16) columns.

15. The frame synchronization composite code match filter according to claim 13, wherein said predetermined coefficients stored in said second buffer serving as said composite code comprise Hadamard coefficients.

16. The frame synchronization composite code match filter according to claim 13 further comprising a squarer and an added interposed between said correlator and said enable and shift register.

17. A method for receiving a signal containing data carrying a search code hierarchically composed of two codes, a subcode and a composite code, said method comprising the steps of:

(a) receiving a signal and filtering the signal against said subcode and providing an output thereof; and (b) periodically multiplying the contents of the temporarily stored filtered output with said composite code and then adding together the results thereof to determine the correlation between the contents of the two codes which in turn determines and detects the search code being carried by the data.

18. A method for receiving a signal containing data carrying a code and separating the code from other signal components, said method comprising the steps of:

(a) determining a subcode and a composite code of a Golay code, said subcode comprised of a predetermined number of coefficients and said composite code comprised of a predetermined number of coefficients;

(b) providing a first shift register having a predetermined number of stages corresponding to the predetermined number of coefficients of said subcode, said first shift register having an input stage connected to receive said signal containing data carrying a code and an output stage;

(c) providing a plurality of multipliers and adders arranged in pairs and in correspondence with said stages of the said first shift register with the first and last pairs of said multipliers and adders being arranged at the input and output stages, respectively, of said first shift register and with each multiplier providing an output to a respective adder and with each multiplier having first and second inputs with the first input being connected to the respective stage of said first shift register, (d) providing a second shift register for separately connecting the coefficients of subcode coefficients to said second input of respective multipliers;

(e) providing a first buffer for temporarily holding the output of said second shift register;

(f) providing a second buffer for temporarily holding the predetermined number of coefficients of said composite code;

(g) providing access and making available the contents of said first buffer and said second buffer for temporarily holding the composite code; and (h) providing a correlator for determining the degree of correlation between the contents of said first buffer and said second buffer for temporarily holding the composite code.

19. The method according to claim 18 further providing a code match filter comprises first and second shift registers and a third buffer for temporarily holding the output of said code match filter.

20. The method according to claim 18, wherein said second buffer for holding said composite code is a circular buffer.

21. The method according to claim 18 wherein said second buffer for holding said composite code is a buffer arranged in a matrix.

22. The method according to claim 21, wherein said matrix has thirty-two (32) rows and sixteen (16) columns.

23. The method according to claim 22, wherein said buffer has stored therein second Hadamard coefficients.

24. The method according to claim 18, wherein said correlator provides an output and further comprising the steps of:

a) providing a third buffer for temporarily holding the output of said correlator and making available the contents of said third buffer;

b) providing a fourth buffer having predetermined locations for its contents; and c) providing a lookup table for directing the storage of the contents of said third buffer into predetermined locations of said fourth buffer.

* * * * *